(12) United States Patent
Khamis et al.

(10) Patent No.: US 12,154,063 B2
(45) Date of Patent: Nov. 26, 2024

(54) VEHICLE LOAD WEIGHT DETERMINATION AND DISTRIBUTION GUIDANCE

(71) Applicant: GM Global Technology Operations LLC, Detroit, MI (US)

(72) Inventors: Alaa M. Khamis, Courtice (CA); Yun Qian Miao, Waterloo (CA); Romeo D. Garcia, Jr., Waterford Township, MI (US); Gaurav Talwar, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 378 days.

(21) Appl. No.: 17/683,843

(22) Filed: Mar. 1, 2022

(65) Prior Publication Data

US 2023/0281552 A1 Sep. 7, 2023

(51) Int. Cl.
  *G06Q 10/083* (2024.01)
  *G01G 19/08* (2006.01)
  *G06N 20/00* (2019.01)

(52) U.S. Cl.
  CPC ........... *G06Q 10/083* (2013.01); *G01G 19/08* (2013.01); *G06N 20/00* (2019.01)

(58) Field of Classification Search
  CPC ............. G06Q 10/083; G06Q 10/0832; G06Q 10/0833; G06Q 10/0835; G06Q 10/0837; G06Q 10/0838
  See application file for complete search history.

(56) References Cited

U.S. PATENT DOCUMENTS

| | | | |
|---|---|---|---|
| 11,200,531 B1* | 12/2021 | Brady | B65G 47/901 |
| 2019/0285501 A1* | 9/2019 | Jensen | B60T 8/1708 |
| 2020/0231386 A1* | 7/2020 | Shiu | B65G 1/1371 |
| 2021/0158185 A1* | 5/2021 | McFarland | G07C 5/0866 |

OTHER PUBLICATIONS

Yao, ZongWei, et al. "Deep learning-based prediction of piled-up status and payload distribution of bulk material." Automation in Construction 121 (2021): 103424. (Year: 2021).*

* cited by examiner

*Primary Examiner* — Emmett K. Walsh
(74) *Attorney, Agent, or Firm* — CANTOR COLBURN LLP

(57) ABSTRACT

A method includes virtually dividing a cargo area of a vehicle into a plurality of virtual cells. The method also includes creating, by implementing machine learning, a load profile for the cargo area. The load profile indicates a weight estimate at each of the plurality of virtual cells based on a load in the cargo area. Guidance on moving the load within the cargo area is provided based on the load profile to balance the load in the cargo area.

20 Claims, 4 Drawing Sheets

VEHICLE LOAD WEIGHT DETERMINATION AND DISTRIBUTION GUIDANCE

INTRODUCTION

The subject disclosure relates to vehicle load weight determination and distribution guidance.

Vehicles (e.g., automobiles, trucks, construction equipment, farm equipment) may be used to transport heavy loads. Generally, a manufacturer indicates the weight that may safely be carried by a given type of vehicle. For example, the gross axle weight rating (GAWR) for a given vehicle indicates the maximum distributed weight that may be supported by an axle of the vehicle. Carrying a load that exceeds the recommended weight can have several detrimental effects including instability of the vehicle. Accordingly, it is desirable to provide vehicle load weight determination and distribution guidance.

SUMMARY

In one exemplary embodiment, a system in a vehicle includes memory storing computer-readable instructions and one or more processors to execute the computer-readable instructions. The computer-readable instructions control the one or more processors to perform processes that include virtually dividing a cargo area of the vehicle into a plurality of virtual cells, and creating, by implementing machine learning, a load profile for the cargo area. The load profile indicates a weight estimate at each of the plurality of virtual cells based on a load in the cargo area. The processes also include providing guidance on moving the load within the cargo area, based on the load profile, to balance the load in the cargo area.

In addition to one or more of the features described herein, the processes further comprise determining whether the cargo area includes one or more weight sensors.

In addition to one or more of the features described herein, the creating the load profile includes obtaining weight values from each of the one or more weight sensors based on determining that the cargo area includes the one or more weight sensors.

In addition to one or more of the features described herein, the creating the load profile includes obtaining weight values from sensor measurements of at least one of one or more tire pressure sensors, an inertial measurement unit, and one or more suspension sensors.

In addition to one or more of the features described herein, the obtaining the weight values from the sensor measurements includes implementing machine learning to map the sensor measurements to the weight values.

In addition to one or more of the features described herein, the processes further comprise fusing the weight values obtained with two or more types of the sensor measurements.

In addition to one or more of the features described herein, the creating the load profile includes mapping the weight values to the weight estimate at each of the plurality of virtual cells.

In addition to one or more of the features described herein, the processes further comprise obtaining images of the cargo area from a camera and determining which of the virtual cells are occupied, and the creating the load profile includes using the occupancy of the virtual cells during the implementing the machine learning.

In addition to one or more of the features described herein, the providing the guidance includes providing speech.

In addition to one or more of the features described herein, the providing the guidance includes providing text.

In another exemplary embodiment, a method includes virtually dividing a cargo area of a vehicle into a plurality of virtual cells and creating, by implementing machine learning using the processor, a load profile for the cargo area. The load profile indicates a weight estimate at each of the plurality of virtual cells based on a load in the cargo area. The method also includes providing guidance on moving the load within the cargo area, based on the load profile, to balance the load in the cargo area.

In addition to one or more of the features described herein, the method also includes determining whether the cargo area includes one or more weight sensors.

In addition to one or more of the features described herein, the creating the load profile includes obtaining weight values from each of the one or more weight sensors based on determining that the cargo area includes the one or more weight sensors.

In addition to one or more of the features described herein, the creating the load profile includes obtaining weight values from sensor measurements of at least one of one or more tire pressure sensors, an inertial measurement unit, and one or more suspension sensors.

In addition to one or more of the features described herein, the obtaining the weight values from the sensor measurements includes implementing machine learning to map the sensor measurements to the weight values.

In addition to one or more of the features described herein, the method also includes fusing the weight values obtained with two or more types of the sensor measurements.

In addition to one or more of the features described herein, the creating the load profile includes mapping the weight values to the weight estimate at each of the plurality of virtual cells.

In addition to one or more of the features described herein, the method also includes obtaining images of the cargo area from a camera and determining which of the virtual cells are occupied, and the creating the load profile includes using the occupancy of the virtual cells during the implementing the machine learning.

In addition to one or more of the features described herein, the providing the guidance includes providing speech.

In addition to one or more of the features described herein, the providing the guidance includes providing text.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
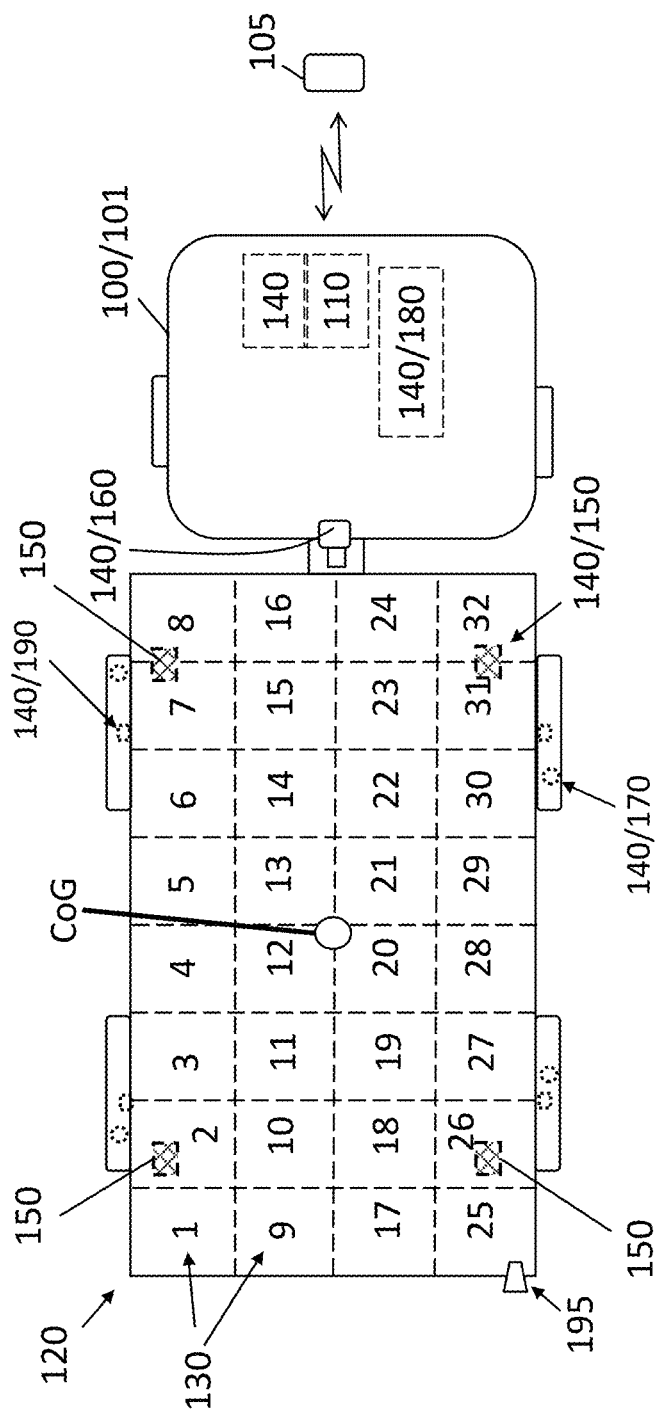
FIG. 1 is a block diagram of a vehicle that includes load weight determination and distribution guidance according to one or more embodiments.

The following description is merely exemplary in nature and is not intended to limit the present disclosure, its application or uses. It should be understood that throughout the drawings, corresponding reference numerals indicate like or corresponding parts and features.

Embodiments of the systems and methods detailed herein relate to vehicle load weight determination and distribution guidance. As previously noted, carrying a load that exceeds the maximum weight recommended for a given vehicle can have detrimental effects. According to one or more embodiments, a warning may be issued to a driver when a load weight is determined to approach or exceed a maximum. Even when a load does not exceed the recommended maximum weight, its distribution within the vehicle may be such that stability is affected or one or more tires bears a larger portion of the load and experiences more wear, for example. An unbalanced load may also affect the calibration of sensors, such as a camera, by making the vehicle tilted from its reference position. According to one or more embodiments, these issues may be avoided based on distribution guidance, as detailed.

In accordance with an exemplary embodiment, FIG. 1 is a block diagram of a vehicle 100 that includes load weight determination and distribution guidance. The exemplary vehicle 100 shown in FIG. 1 is a flatbed truck 101 with a flat truck bed as the cargo area 120. The exemplary illustration is not intended to limit the type of vehicle 100 or the type of cargo area 120. A controller 110 of the vehicle 100 may determine the load weight in the cargo area 120 and provide load distribution guidance as detailed.

The controller 110 may include processing circuitry that may include an application specific integrated circuit (ASIC), an electronic circuit, a processor (shared, dedicated, or group) and memory that executes one or more software or firmware programs, a combinational logic circuit, and/or other suitable components that provide the described functionality. The controller 110 may also include communication systems that facilitate communication with devices 105 (e.g., smart phone, tablet) carried by an occupant of the vehicle 100, for example. The memory of the controller 110 may include a non-transitory computer-readable medium that stores instructions which, when processed by one or more processors of the controller 110, implement a method of performing load weight determination and distribution guidance in a vehicle 100 according to one or more embodiments detailed herein.

The center of gravity (CoG) of the cargo area 120 is indicated, and the cargo area 120 is shown divided into virtual cells 130 that make up a virtual grid. The CoG is the point at which weight is evenly dispersed and the point at which all the weight in the cargo area 120 can be considered as being concentrated. The virtual cells 130 are numbered for explanatory purposes. The controller 110 estimates the weight of the load at each virtual cell 130 in order to provide the distribution guidance. Based on the size of the cargo area 120 and on the resolution at which load distribution information is desired or required, fewer or more virtual cells 130 may be used. The guidance provided by the controller 110 may be visual (e.g., text displayed on a device 105 or an infotainment display, color or other display), audible (e.g., voice commands via a speaker 195 based on text-to-speech processing or predefined commands), haptic, or via any other available feedback mechanism (broadly referred to as human-machine interface (HMI)) of the vehicle 100.

Figure 2:
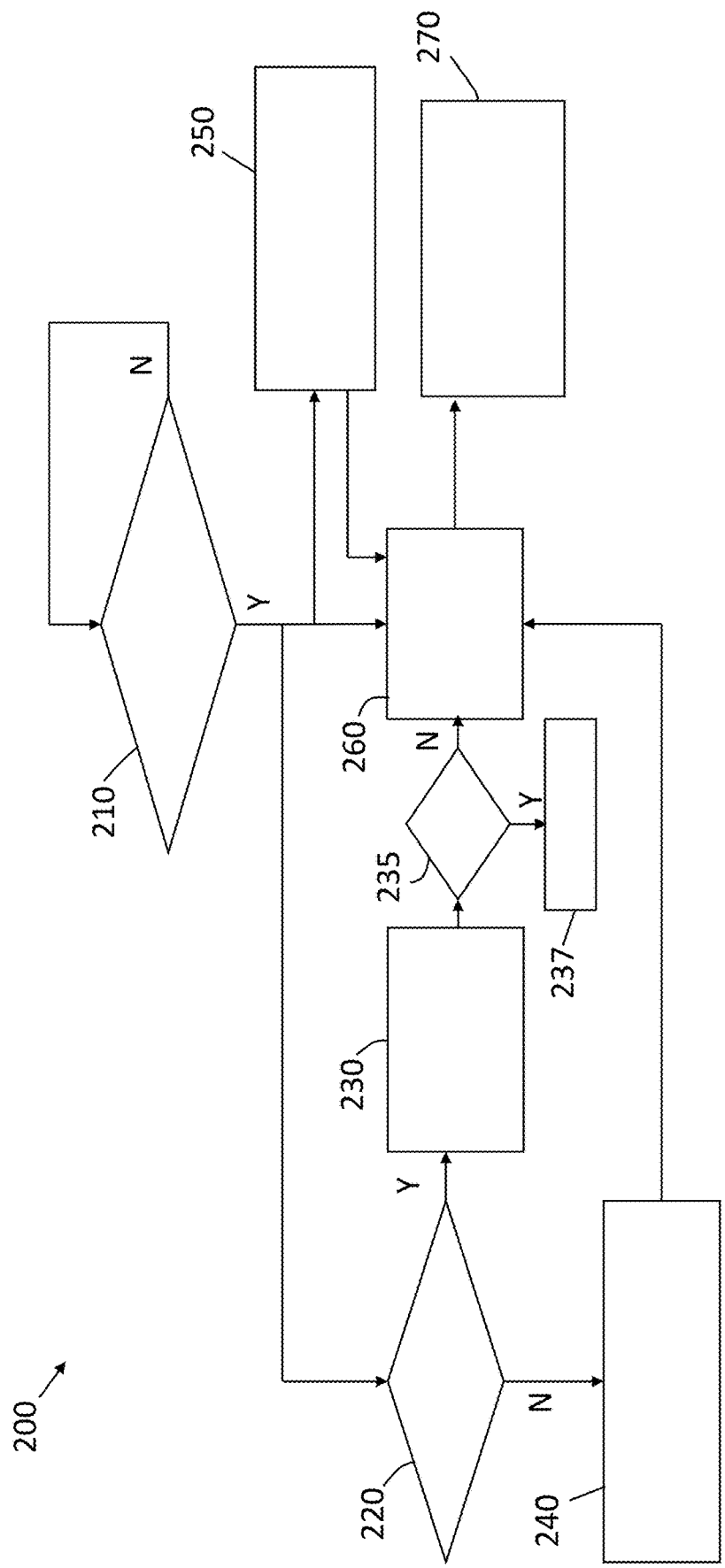
FIG. 2 is a process flow of a method of providing load weight determination and distribution guidance in a vehicle according to one or more embodiments.

The vehicle 100 may include any number of sensors 140 that obtain information about the vehicle 100 and about objects around the vehicle 100. One type of sensor 140 shown in FIG. 1 is a weight sensor 150. Four optional weight sensors 150 are shown at the four corners of the cargo area 120. Another type of sensor 140 shown in FIG. 1 is a camera 160. While additional forward, side, and rear-facing cameras 160 may be used to detect objects around the vehicle 100, the camera 160 shown in FIG. 1 obtains images of the cargo area 120. Additional types of vehicle sensors 140 that are relevant to the discussion with reference to FIG. 2 are the tire pressure monitoring system (TPMS) 170, inertial measurement unit (IMU) 180, and suspension sensors 190. FIG. 2 details the processes by which the controller 110 estimates the weight at each virtual cell 130 using these sensors 140.

FIG. 2 is a process flow of a method 200 of providing load weight determination and distribution guidance in a vehicle 100 according to one or more embodiments. The processes shown in FIG. 2 may be performed by the controller 110 based on information from various sensors 140. At block 210, a check is done of whether a load has been placed in the cargo area 120. This check may be based on the camera 160, for example. Determining, based on the check at block 210, that there is a load in the cargo area 120, triggers the remaining processes. If the check at block 210 indicates that there is no load in the cargo area 120, then, as indicated, the check is repeated.

This check at block 210 may be repeated periodically at a predefined time interval or may be repeated based on a predefined event. For example, when a key fob corresponding to the vehicle 100 is detected, the check at block 210 may be performed periodically until the vehicle 100 is moving. The check may be repeated every time the vehicle 100 is parked, for example. The trigger for the check at block 210 is not intended to be limited by the examples. If the check at block 210 indicates that there is a load in the cargo area 120, then the processes at blocks 220 and 260 are triggered. At block 260, creating a load profile is based on information obtained and provided by other processes, as detailed. At block 220, a check is done of whether there are weight sensors 150 in the cargo area 120.

If the check at block 220 indicates that there are weight sensors 150 in the cargo area 120, then, at block 230, a weight measurement is obtained from each of the weight sensors 150 in the cargo area 120. At block 235, a check is done of whether the weight sensors 150 indicate that a maximum weight has been exceeded. The maximum weight of a load that may be carried by the vehicle 100 may be established by the manufacturer, for example, to ensure stability. If the maximum weight has been exceeded, according to the check at block 235, then an alert is issued at block 237. The issuing of the alert may be via any available HMI or mechanism (e.g., speaker 195).

If the maximum weight has not been exceeded, according to the check at block 235, then the load profile is created at block 260. According to exemplary embodiments, even if the maximum weight has been exceeded according to the check at block 235, processing may proceed to obtaining a load profile at block 260 after an alert has been issued at block 237. Additional checks may be performed even when the processing at block 260 is reached. For example, if the weight is within some percentage (e.g., 90 percent) of the maximum weight, then a warning may still be issued. This warning may also be issued via visual, audio, or haptic outputs.

If the check at block 220 indicates that there are no weight sensors 150 in the cargo area 120, then weight information must be gleaned from other sensors, at block 240. The processes at block 240 involve the TPMS 170, IMU 180, and suspension sensors 190. As further discussed with reference to FIG. 3, the information from each of these sensors 140 is mapped to weight using machine learning for the mapping, for example.

At block 250, obtaining a virtual grid occupancy mapping refers to using images from the camera 160, for example, to estimate the parts (e.g., virtual cells 130) of the cargo area 120 that are occupied with the load that was detected at block 210. Images from the camera 160 may be overlaid on the virtual cells 130 and a higher weight may be given to the virtual cells 130 in which a load is present according to the images, for example. This weighting may be used, at block 310, to obtain estimates of weight at each virtual cell 130, as further discussed with reference to FIG. 3.

Based on the trigger from block 210 and the information from blocks 250 and 230 or 240 (based on whether there are weight sensors 150 according to the check at block 220), the processes include creating a load profile at block 260. This process is further discussed with reference to FIG. 3 and results in an estimated weight at each virtual cell 130. At block 270, providing loading guidance refers to the controller 110 providing suggestions on how to move the load to better balance weight in the cargo area 120, as detailed with reference to FIG. 4. As previously noted, the guidance may be provided via a device 105 that the controller 110 communicates with, via an interior or exterior speaker 195, or via any other known HMI or mechanism.

Figure 3:
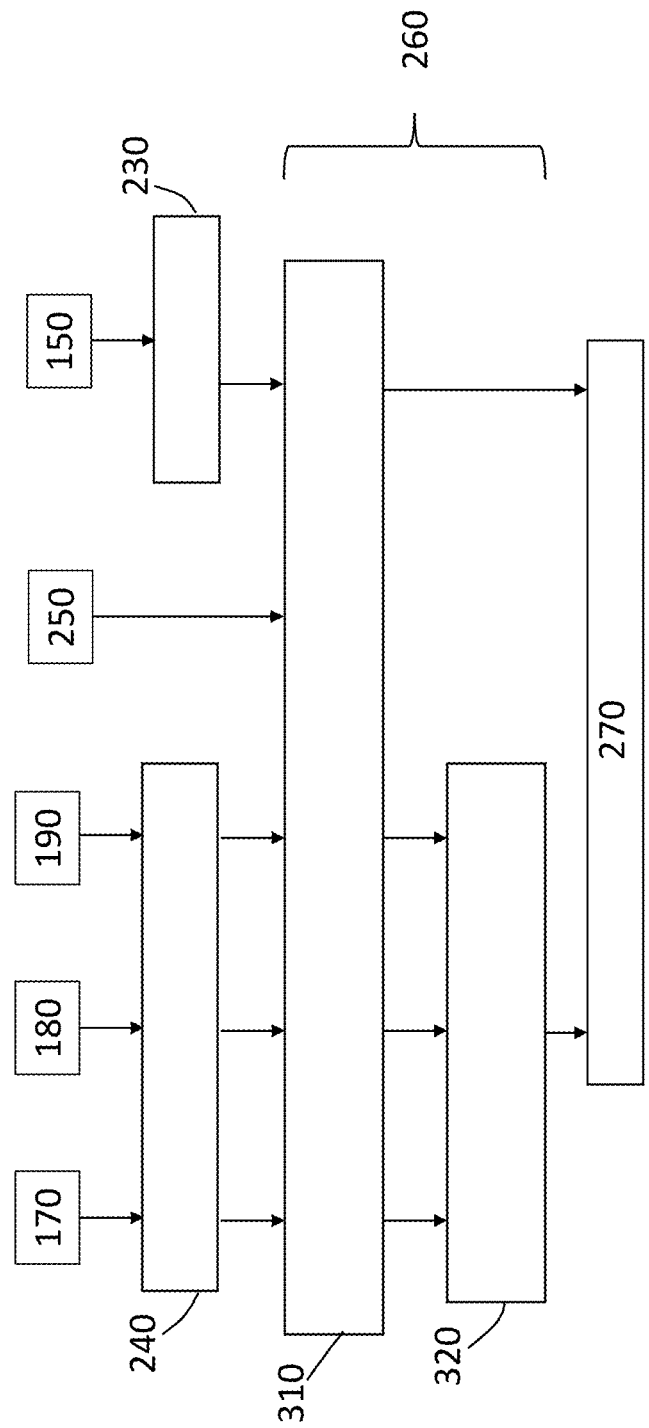
FIG. 3 details aspects of creating a load profile as part of the load weight determination and distribution guidance according to one or more embodiments.

FIG. 3 details aspects of creating a load profile at block 260. As discussed with reference to FIG. 2, weights may be obtained at block 230 from weight sensors 150 or at block 240 based on other sensors 140. At block 230, a weight value may be obtained from each of the weight sensors 150 in the cargo area 120 (e.g., four weight values according to the exemplary illustration in FIG. 1). At block 240, a weight value may be obtained from each tire pressure sensor of the TPMS 170, from each suspension sensor 190, and from the IMU 180. The weight values may be obtained based on a mapping of the sensor measurement to weight. For example, the tire pressure measured by each of the four sensors of the TPMS 170 shown in FIG. 1 may be mapped to four weight values. The mapping may be different for each type of sensor 140 (e.g., different mapping for TPMS 170 and IMU 180), and may be a machine learning-based mapping implemented by the controller 110 following training.

Creating the load profile, at block 260, involves the process at block 310 and, when sensors 140 other than the weight sensors 150 are used, also the process at block 320. At block 310, estimating the weight at each virtual cell 130 involves a mapping of the weight values. The weight values may either be obtained at block 230 from each of the weight sensors 150 or at block 240 from the other sensors 140 (e.g., TPMS 170, IMU 180, suspension sensors 190). Like the mapping at block 240, the mapping of weight value to a weight estimate at each virtual cell 130 may be implemented through machine learning and may differ for each type of sensor 140. This mapping may additionally use the virtual grid occupancy mapping from block 250.

For example, the weight value obtained, at block 230, from each of the four weight sensors 150 shown in FIG. 1 may be mapped to weight estimates for each of the thirty-two virtual cells 130 shown in FIG. 1. For example, if the two weight sensors 150 on the left side of the vehicle 100 measure higher weight values than the two weight sensors 150 on the right side, the virtual grid occupancy mapping from block 250 may be used to determine if the load in the cargo area 120 is distributed more among the front or back virtual cells 130 on the left side of the vehicle 100. That is, the virtual grid occupancy mapping from block 250 may be added as a weighting to the mapping process.

The mapping process, at block 310, provides the load profile (i.e., indication of weight estimate at each virtual cell 130) in the case of the weight values being obtained, at block 230, from the weight sensors 150. In the case of the weight values being obtained, at block 240, from the other sensors 140, one set of weight estimates for each of the virtual cells 130 is obtained for each type of sensor 140. That is, three separate load profiles are obtained based on the three sensors 140 (i.e., TPMS 170, IMU 180, and suspension sensors 190) in the exemplary case. Thus, the fusion process, at block 320, is additionally needed to create the load profile.

At block 320, the load profiles obtained with the different sensors 140 used at block 240 are fused. Each weight estimate at each virtual cell 130 is obtained, via the mapping, with a confidence score that may be used as a weighting. Thus, for each virtual cell 130 (e.g., i is an index of virtual cells 130 and i=1 to 32 in the example of FIG. 1), the weight estimate obtained, at block 310, using the TPMS 170 is $l_{Ti}$ with a variance $\sigma_{Ti}$, the weight estimate obtained using the IMU 180 is $l_{Ii}$ with a variance $\sigma_{Ii}$, and the weight estimate obtained using the suspension sensors 190 is $l_{Si}$ with a variance $\sigma_{Si}$. A corresponding weighting ($w_{Ti}$, $w_{Ii}$, and $w_{Si}$) associated with each weight estimate ($l_{Ti}$, $l_{Ii}$, and $l_{Si}$) is inversely proportional to the variance ($\sigma_{Ti}$, $\sigma_{Ii}$, and $\sigma_{Si}$) of the sensing modality (i.e., associated sensor 140). That is, the more certain modality is given a higher weighting during an information fusion process. The fused estimated weight at each virtual cell 130 is given by:

$$l_i = \text{median} \left( \frac{w_{Ti}}{w_{Ti} + w_{Ii} + w_{Si}} l_{Ti} + \frac{w_{Ii}}{w_{Ti} + w_{Ii} + w_{Si}} l_{Ii} + \frac{w_{Si}}{w_{Ti} + w_{Ii} + w_{Si}} l_{Si} \right) \quad [\text{EQ. 1}]$$

Figure 4:
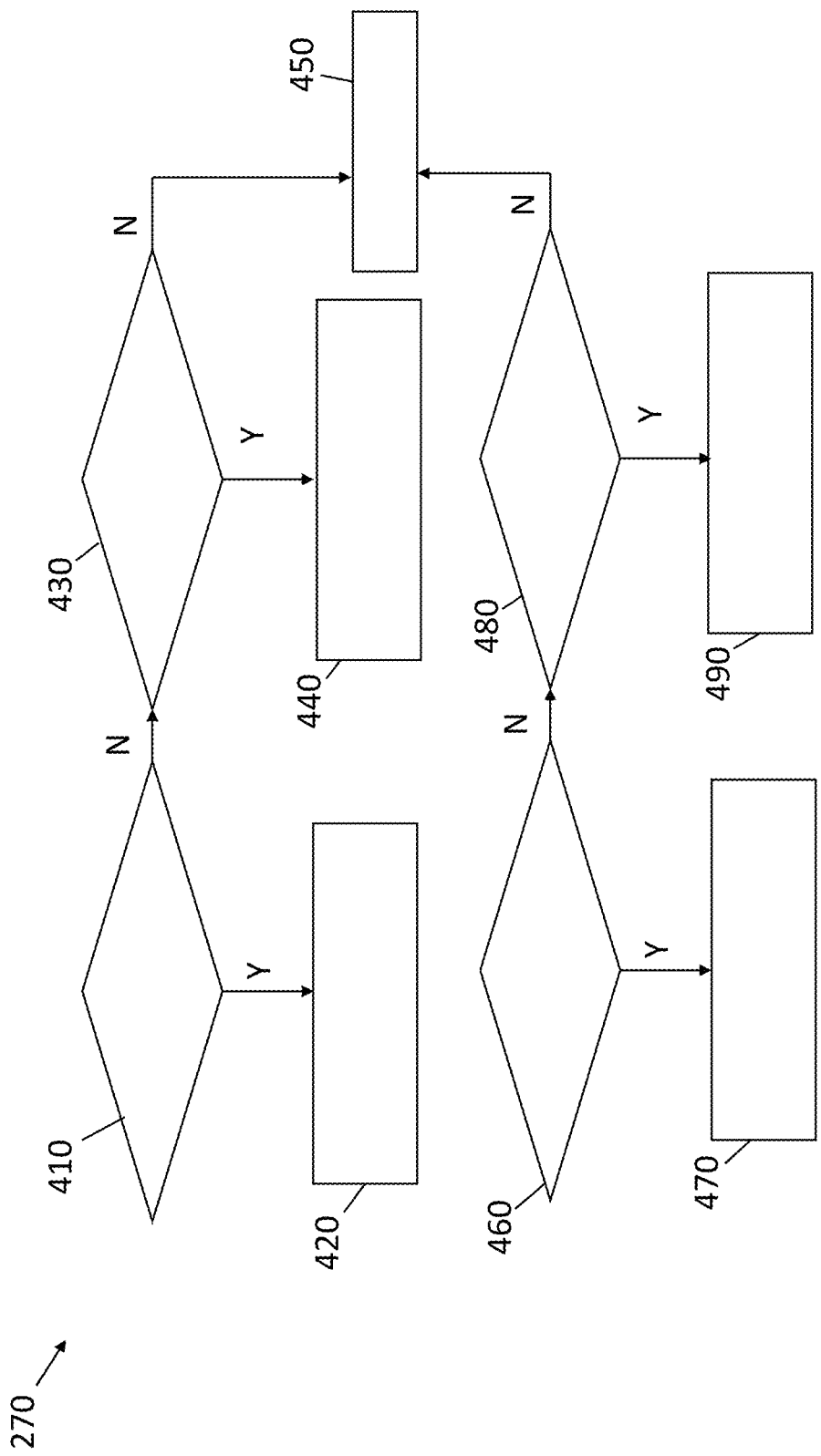
FIG. 4 details processes involved in providing guidance according to one or more embodiments.

FIG. 4 details processes involved in providing guidance at block 270 of FIG. 2. The processes rely on the load profile that is created at block 260. At block 410, a check is done of whether the load at the left side of the cargo area 120 is heavier than the load at the right side by a predefined threshold value ε. The value of the predefined threshold c may be an average human weight used in vehicles, for example. In the exemplary case shown in FIG. 1, the check at block 410 may involve summing the weight estimates (according to the load profile) for the virtual cells 130 numbered as 1-16 and subtracting a sum of the weight estimates for the virtual cells 130 numbered as 17-32.

This difference in weight estimates of the left and right sides may be expressed as $\Delta l_{l-r}$. Alternately, a sigmoid function of the difference may be obtained at block 410 as:

$$\text{sig}(\Delta l_{l-r}) = \frac{1}{1 + e^{-\Delta l_{l-r}}} \quad [\text{EQ. 2}]$$

The result of EQ. 2 is a sigmoid curve with a range (0, 1). If the left side is heavier than the right by more than the predefined or learned threshold value ε (e.g., predefined value that is an average human weight) (e.g., $\Delta l_{l-r} > \varepsilon$ or $sig(\Delta l_{l-r}) > 0.5$), then guidance is provided, at block 420, to move some of the load toward the right. As previously noted, the guidance may be provided through the speaker 195, via a device 105, or via more than one output.

If the check at block 410 indicates that the load at the left side of the cargo area 120 is not heavier than the load at the right side by the predefined threshold value ε, then the opposite scenario is tested at block 430. Specifically, at block 430, a check is done of whether the load at the right side of the cargo area 120 is heavier than the load at the left side by the predefined threshold value ε. In the exemplary case shown in FIG. 1, the check at block 430 may involve summing the weight estimates (according to the load profile) for the virtual cells 130 numbered as 17-32 and subtracting a sum of the weight estimates for the virtual cells 130 numbered as 1-16.

This difference in weight estimates of the left and right sides may be expressed as $\Delta l_{r-l}$. Alternately, a sigmoid function of the difference may be obtained at block 430 by modifying EQ. 2 to use $\Delta l_{r-l}$ rather than $\Delta l_{l-r}$. If the right side is heavier than the left by more than the predefined threshold value ε (e.g., $\Delta l_{r-l} > \varepsilon$, or $sig(\Delta l_{r-l}) > 0.5$), then guidance is provided, at block 440, to move some of the load toward the left. If, instead, the check at block 430 indicates that the load at the right side of the cargo area 120 is not heavier than the load at the left side by the predefined threshold value ε, then no guidance is issued according to block 450.

At block 460, a check is done of whether the load at the front of the cargo area 120 is heavier than the load at the back by a predefined threshold value ε. In the exemplary case shown in FIG. 1, the check at block 460 may involve summing the weight estimates (according to the load profile) for the virtual cells 130 numbered as 5-8, 13-16, 21-24, and 29-32 and subtracting a sum of the weight estimates for the virtual cells 130 numbered as 1-4, 9-12, 17-20, and 16-28.

This difference in weight estimates of the front and back may be expressed as $\Delta l_{f-b}$. Alternately, a sigmoid function of the difference may be obtained at block 460 by modifying EQ. 2 to use $\Delta l_{f-b}$ rather than $\Delta l_{l-r}$. If the front is heavier than the back by more than the predefined threshold value ε (e.g., $\Delta l_{f-b} > \varepsilon$, or $sig(\Delta l_{f-b}) > 0.5$), then guidance is provided, at block 470, to move some of the load toward the back. If, instead, the check at block 430 indicates that the load at the right side of the cargo area 120 is not heavier than the load at the left side by the predefined threshold value ε, then no guidance is issued according to block 450.

If the check at block 460 indicates that the load at the front of the cargo area 120 is not heavier than the load at the back by the predefined threshold value ε, then the opposite scenario is tested at block 480. Specifically, at block 480, a check is done of whether the load at the back of the cargo area 120 is heavier than the load at the front by the predefined threshold value ε. In the exemplary case shown in FIG. 1, the check at block 410 may involve summing the weight estimates (according to the load profile) for the virtual cells 130 numbered as 1-4, 9-12, 17-20, and 16-28 and subtracting a sum of the weight estimates for the virtual cells 130 numbered as 5-8, 13-16, 21-24, and 29-32.

This difference in weight estimates of the back and front may be expressed as $\Delta l_{b-f}$. Alternately, a sigmoid function of the difference may be obtained at block 480 by modifying EQ. 2 to use $\Delta l_{b-f}$ rather than $\Delta l_{l-r}$. If the back is heavier than the front by more than the predefined threshold value ε (e.g., $\Delta l_{b-f} > \varepsilon$, or $sig(\Delta l_{b-f}) > 0.5$), then guidance is provided, at block 490, to move some of the load toward the front. If, instead, the check at block 480 indicates that the load at the back of the cargo area 120 is not heavier than the load at the front by the predefined threshold value ε, then no guidance is issued according to block 450.

Once the load is moved, based on the guidance provided according to the processes at block 270, then the processes at blocks 220 through 270 may be repeated to determine if additional guidance and load adjustment is needed. The processes may be triggered and repeated any number of times as loads are added, removed, or moved. According to one or more embodiments, the weight distribution guidance based on the load profile facilitates a load balancing that is either impractical or impossible to perform manually. This is because, while a single item in the cargo area 120 may be positioned (e.g., at the CoG), the load balancing to optimize stability and other factors becomes much more complicated when multiple items of different weights are placed in the cargo area 120.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A system in a vehicle comprising:
   memory storing computer-readable instructions; and
   one or more processors configured to execute the computer-readable instructions, the computer-readable instructions controlling the one or more processors to perform processes comprising:
      virtually dividing a cargo area of the vehicle into a plurality of virtual cells;
      identifying one or more weight sensors in the cargo area;
      creating, by implementing machine learning, a load profile for the cargo area, by obtaining weight values from sensor measurements of at least one of a plurality of tire pressure sensors, and a plurality suspension sensors and includes obtaining weight values from each of one or more weight sensors in the cargo area of the vehicle, wherein the load profile indicates a weight estimate at each of the plurality of virtual cells based on a load in the cargo area;
      determining a first total weight estimate of a first half of the plurality of virtual cells and a second total weight estimate of a second half of the plurality of virtual cells;
      determining a sigmoid function of a difference in the first total weight estimate and the second total weight estimate, wherein the sigmoid function is $sig(\Delta l_{l-r}) = 1/1+e^{-\Delta l}l-r$ and defines a sigmoid curve, and where $\Delta l_{l-r}$ is a difference between the first total weight estimate and the second total weight estimate; and
      responding to a first side of the sigmoid curve being heavier than a second side of the sigmoid curve by greater than a threshold amount by providing guidance to move a portion of the load within the cargo area from the first half of the plurality of virtual cells to the second half of the plurality of virtual cells, to balance the load in the cargo area.

2. The system according to claim 1, wherein the creating the load profile further includes obtaining weight values from an inertial measurement unit.

3. The system according to claim 2, wherein the obtaining the weight values from the sensor measurements includes implementing machine learning to map the sensor measurements to the weight values.

4. The system according to claim 2, wherein the processes further comprise fusing the weight values obtained with two or more types of the sensor measurements.

5. The system according to claim 2, wherein the creating the load profile includes mapping the weight values to the weight estimate at each of the plurality of virtual cells.

6. The system according to claim 1, wherein the processes further comprise obtaining images of the cargo area from a camera and determining which of the virtual cells are occupied, and the creating the load profile includes using the occupancy of the virtual cells during the implementing the machine learning.

7. The system according to claim 1, wherein providing the guidance includes providing speech.

8. The system according to claim 1, wherein providing the guidance includes providing text.

9. The system of claim 1, wherein obtaining weight values from sensor measurements of at least one of a plurality of tire pressure sensors and a plurality suspension sensors comprises obtaining weight values from both the plurality of tire pressure sensors and the plurality of suspension sensors.

10. The system of claim 1, further comprising responding to implementation of the guidance by reiterating the processes.

11. A method comprising:
virtually dividing, using a processor, a cargo area of a vehicle into a plurality of virtual cells;
identifying one or more weight sensors in the cargo area;
creating, by implementing machine learning using the processor, a load profile for the cargo area, wherein the load profile is created by obtaining weight values from sensor measurements of at least one of a plurality of tire pressure sensors, and a plurality suspension sensors and includes obtaining weight values from each of one or more weight sensors in the cargo area of the vehicle wherein the load profile indicates a weight estimate at each of the plurality of virtual cells based on a load in the cargo area;
determining a first total weight estimate of a first half of the plurality of virtual cells and a second total weight estimate of a second half of the plurality of virtual cells;
determining a sigmoid function of a difference in the first total weight estimate and the second total weight estimate, wherein the sigmoid function is $sig(\Delta l_{l-r})=1/1+e^{-\Delta l}1-r$ and defines a sigmoid curve, and where $\Delta l_{l-r}$, is a difference between the first total weight estimate and the second total weight estimate; and
responding to a first side of the sigmoid curve being heavier than a second side of the sigmoid curve by greater than a threshold amount by providing guidance to move a portion of the load within the cargo area from the first half of the plurality of virtual cells to the second half of the plurality of virtual cells to balance the load in the cargo area.

12. The method according to claim 11, wherein the creating the load profile further includes obtaining weight values from sensor measurements of an inertial measurement unit.

13. The method according to claim 12, wherein the obtaining the weight values from the sensor measurements includes implementing machine learning to map the sensor measurements to the weight values.

14. The method according to claim 12, further comprising fusing the weight values obtained with two or more types of the sensor measurements.

15. The method according to claim 12, wherein the creating the load profile includes mapping the weight values to the weight estimate at each of the plurality of virtual cells.

16. The method according to claim 11, further comprising obtaining images of the cargo area from a camera and determining which of the virtual cells are occupied, and the creating the load profile includes using the occupancy of the virtual cells during the implementing the machine learning.

17. The method according to claim 11, wherein providing the guidance includes providing speech.

18. The method according to claim 11, wherein providing the guidance includes providing text.

19. The method of claim 11, wherein obtaining weight values from sensor measurements of at least one of a plurality of tire pressure sensors and a plurality suspension sensors comprises obtaining weight values from both the plurality of tire pressure sensors and the plurality of suspension sensors.

20. The method of claim 11, further comprising responding to implementation of the guidance by reimplementing the method.

\* \* \* \* \*